UNITED STATES PATENT OFFICE.

ARTHUR PETIT, OF PARIS, FRANCE.

COMPOSITION OF MATTER FOR MANUFACTURING ARTIFICIAL-SILK THREADS.

SPECIFICATION forming part of Letters Patent No. 665,975, dated January 15, 1901.

Application filed September 18, 1900. Serial No. 30,425. (No specimens.)

*To all whom it may concern:*

Be it known that I, ARTHUR PETIT, a citizen of the Republic of France, residing at Paris, France, have invented certain new and useful Improvements in a Composition of Matter for the Manufacture of Artificial-Silk Threads, of which the following is a specification.

The present invention relates to the production of artificial silk having a nitrocellulose base. This type of artificial silk and the method of its manufacture are now well known, and it would probably be more widely used but for certain disadvantages, among which are the necessity for denitrating the product and the fact that the material is very inflammable. The object of the hereinafter-described improvements is to avoid these disadvantages and at the same time to produce an artificial silk having all the appearance of natural raw silk, together with sensibly the same strength and firmness.

In carrying out my invention I intimately mix together dry nitrocellulose, india-rubber solution, and a salt of tin in any suitable proportions. So far I have found that I obtain the more perfect results by using as the tin salt stannous chlorid and by mixing thoroughly the several ingredients in about the following proportions—that is to say: one hundred pounds of dry nitrocellulose, seven pounds of india-rubber solution, and five pounds of stannous chlorid, a sufficiency of a suitable solvent, such as benzene, being added to bring the mixture to the necessary working consistency. The mixture is squirted through dies to form threads under hydraulic, pneumatic, or mechanical pressure, as in the existing modes of manufacture of artificial silks of the same type. It will be understood that if necessary the mixture is to be filtered before it is formed into threads and that owing to its peculiar composition water has no effect on the product.

Having now particularly described and ascertained the nature of my said invention and in what manner the same is to be performed, I declare that what I claim is—

1. A composition of matter for the manufacture of artificial-silk threads composed of dry nitrocellulose, india-rubber and a salt of tin and produced substantially as and by the means hereinbefore described.

2. A composition of matter for the manufacture of artificial-silk threads consisting of about one hundred pounds of dry nitrocellulose, seven pounds of india-rubber solution and five pounds of stannous chlorid, mixed with a sufficiency of a solvent to bring it to the required consistency, substantially as hereinbefore described.

In testimony that I claim the foregoing as my invention I have signed my name in presence of two subscribing witnesses.

ARTHUR PETIT.

Witnesses:
   EDWARD P. MACLEAN,
   HENRY DANZER.